United States Patent
Porokh et al.

(10) Patent No.: US 10,212,204 B2
(45) Date of Patent: Feb. 19, 2019

(54) SYSTEMS AND METHODS FOR IMPROVING MEDIA DATA COMMUNICATIONS OVER A NETWORK

(71) Applicant: RingCentral, Inc., Belmont, CA (US)

(72) Inventors: Dmitry Sergeevich Porokh, Saint Petersburg (RU); Aleksei Dmitrievich Shpagin, Saint Petersburg (RU); Alexey Nicolaevich Sobolev, Saint Petersburg (RU); Vlad Vendrow, Redwood City, CA (US); Santosh Panattu, San Jose, CA (US); Aleksei Petrov, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 196 days.

(21) Appl. No.: 15/210,762

(22) Filed: Jul. 14, 2016

(65) Prior Publication Data
US 2017/0302722 A1    Oct. 19, 2017

Related U.S. Application Data

(63) Continuation of application No. PCT/RU2016/000221, filed on Apr. 19, 2016.

(51) Int. Cl.
*G06F 15/16*  (2006.01)
*H04L 29/06*  (2006.01)

(52) U.S. Cl.
CPC ......... *H04L 65/608* (2013.01); *H04L 65/607* (2013.01); *H04L 65/80* (2013.01)

(58) Field of Classification Search
CPC ..... H04L 65/02; H04L 65/80; H04L 43/0864; H04L 29/08072

(Continued)

(56) References Cited

U.S. PATENT DOCUMENTS

| | | | |
|---|---|---|---|
| 8,228,861 B1 * | 7/2012 | Nix | H04W 36/00 370/329 |
| 8,249,076 B1 * | 8/2012 | Bertone | H04L 65/1043 370/395.2 |

(Continued)

OTHER PUBLICATIONS

International Search Report from the International Searching Authority for International Application No. PCT/RU 2016/000221, dated Dec. 29, 2016 (2 pages).

(Continued)

*Primary Examiner* — Khanh Q Dinh
(74) *Attorney, Agent, or Firm* — Finnegan, Henderson, Farabow, Garrett & Dunner LLP

(57) ABSTRACT

Systems and methods are disclosed for improving transmission of media data contained in data packets in a media session established over a network. According to certain embodiments, a first server can determine that at least one media quality metric associated with the media session is below one or more pre-determined thresholds, the at least one media quality metric being indicative of a media quality. The first server can also obtain identification information associated with the media session, provide the identification information to a second server, receive, from the second server data, related to a transmission of data packets, and media data contained in the data packets. The first server can determine configurations based on the received data related to a transmission of data packets. At least one of the first and second servers can be configured based on the determined configurations to provide a pre-determined media quality.

18 Claims, 7 Drawing Sheets

(58) Field of Classification Search
USPC ......... 709/203, 227, 228, 231, 232; 382/112
See application file for complete search history.

(56) References Cited

U.S. PATENT DOCUMENTS

| | | | | |
|---|---|---|---|---|
| 8,305,980 B1* | 11/2012 | Nix | ....................... | H04W 36/00 370/329 |
| 8,792,448 B2* | 7/2014 | Nix | ....................... | H04W 36/00 370/329 |
| 8,959,239 B2* | 2/2015 | Pettersson | ............... | H04L 65/80 709/227 |
| 9,032,427 B2* | 5/2015 | Gallant | ............... | H04L 41/5038 725/9 |
| 9,414,248 B2* | 8/2016 | Kovvali | ............... | H04W 24/08 |
| 9,438,494 B2* | 9/2016 | Samuell | ............... | H04L 43/0811 |
| 9,692,906 B2* | 6/2017 | Cerami | ............... | H04M 1/2535 |
| 9,729,492 B2* | 8/2017 | Gvildys | ................. | H04L 51/30 |
| 2007/0244880 A1* | 10/2007 | Martin | .............. | G06F 17/30038 |
| 2009/0222392 A1* | 9/2009 | Martin | ................. | G11B 27/105 706/46 |
| 2012/0036215 A1 | 2/2012 | Perryman et al. | | |
| 2013/0322263 A1* | 12/2013 | Lang | ....................... | H04L 65/80 370/244 |
| 2014/0237361 A1* | 8/2014 | Martin | ................. | G11B 27/105 715/716 |
| 2015/0120896 A1 | 4/2015 | Dunne et al. | | |
| 2015/0365320 A1* | 12/2015 | Xu | ....................... | H04L 45/245 370/226 |
| 2016/0094586 A1 | 3/2016 | Gunnalan et al. | | |

OTHER PUBLICATIONS

Written Opinion from the International Searching Authority for International Application No. PCT/RU 2016/000221, dated Dec. 29, 2016 (4 pages).

* cited by examiner

Figure 3B:
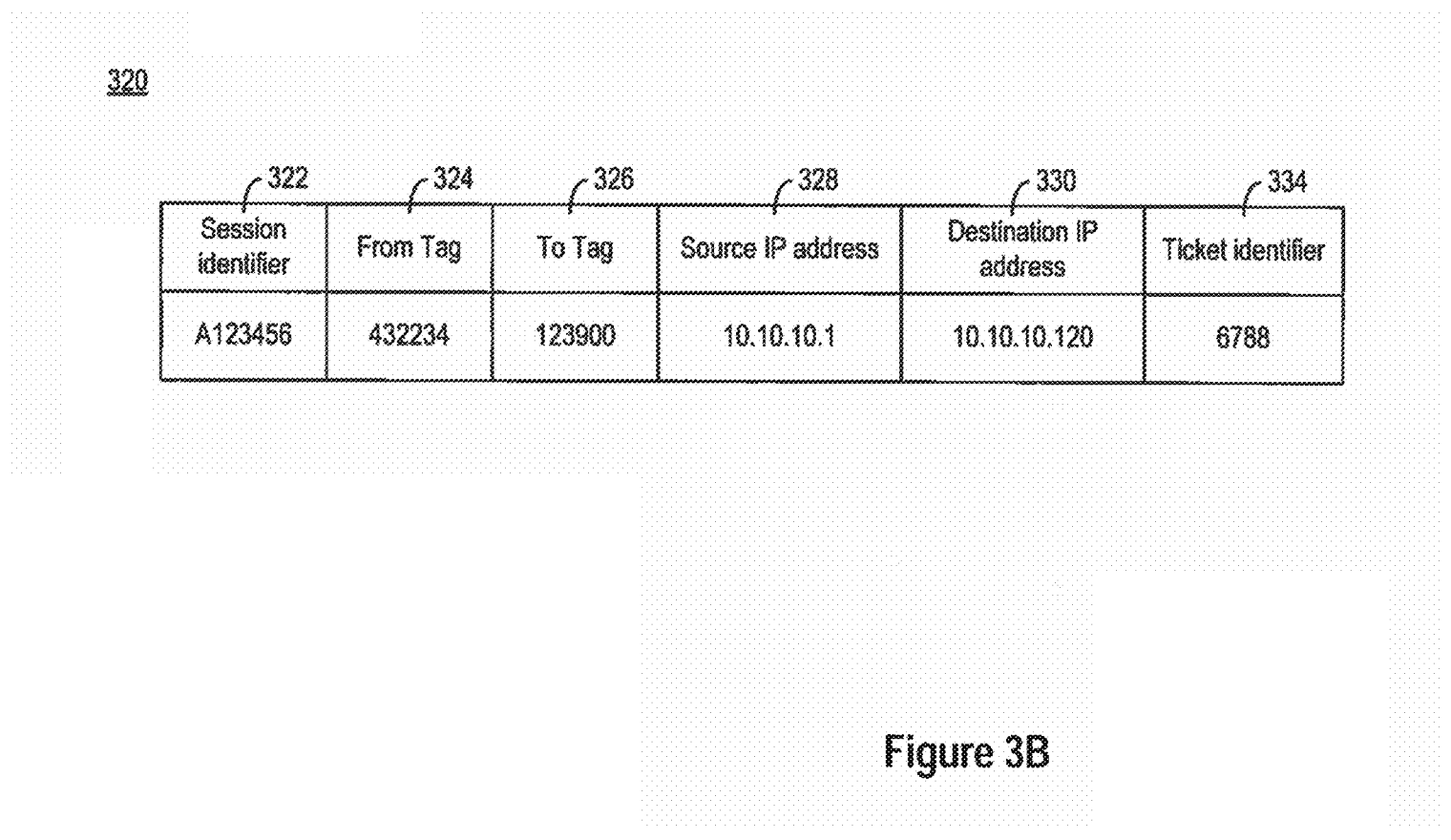

| Session identifier | From Tag | To Tag | Source IP address | Destination IP address | Ticket identifier |
|---|---|---|---|---|---|
| A123456 | 432234 | 123900 | 10.10.10.1 | 10.10.10.120 | 6788 |

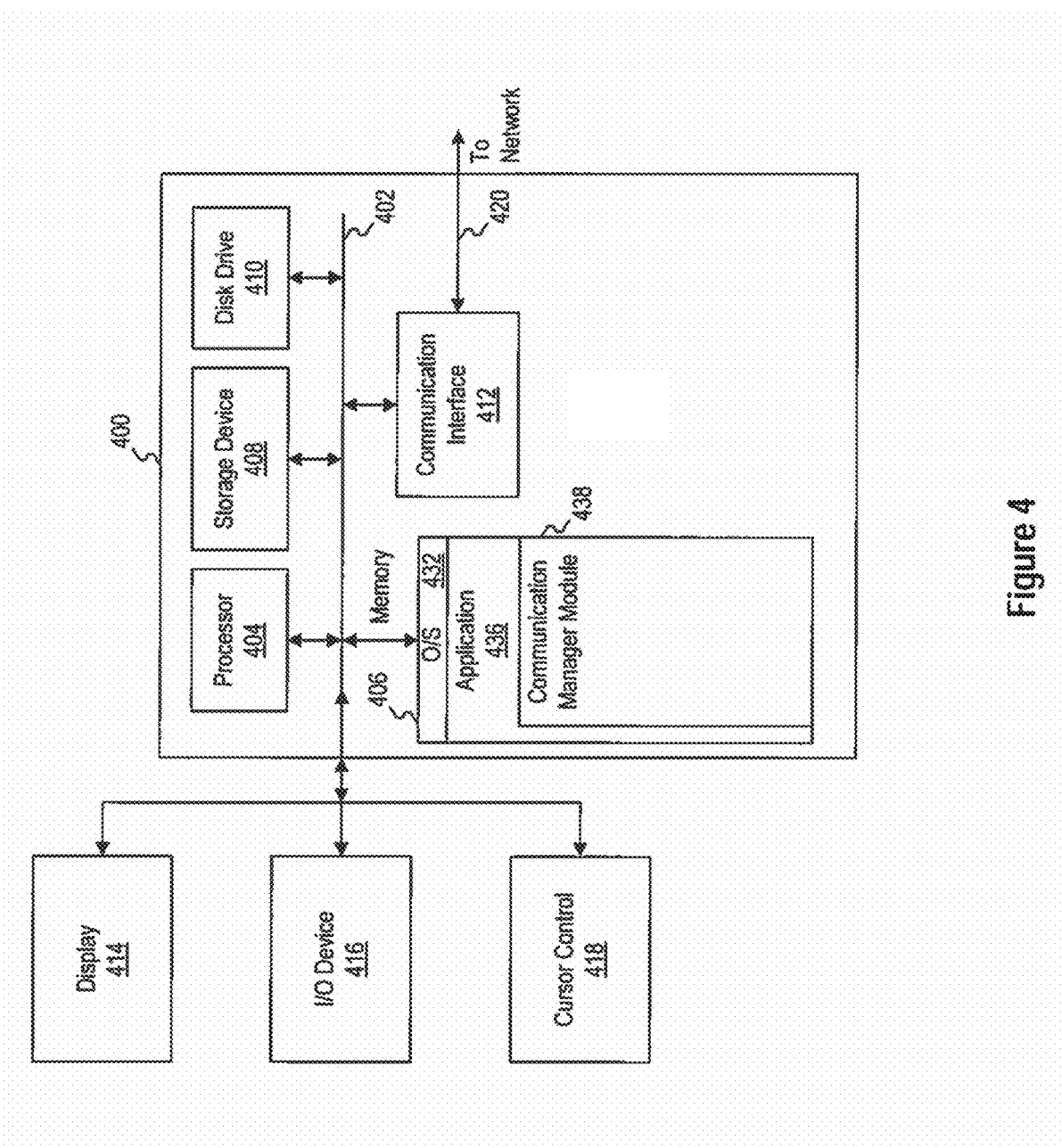

SYSTEMS AND METHODS FOR IMPROVING MEDIA DATA COMMUNICATIONS OVER A NETWORK

FIELD

The present disclosure relates to data communications systems, and more specifically, to systems and methods for improving media data communications over a network.

BACKGROUND

There are many existing network services that require real-time communication of data over a network. For example, packet-based communication service, such as media-over-IP services, typically include the real-time delivery of voice, and possibly other media data types such as video data, on a network using a Real-Time Transport Protocol (RTP) to exchange information required to control the delivery of data. Many different network conditions and data processing configurations (e.g., choice of codec) can adversely affect the communication of data, and the quality of the communications service. Besides, those network conditions and data processing configurations can also affect different data streams (e.g., associated with different transmission protocols, different media sessions, different users, etc.) differently.

SUMMARY

The present disclosure arises from the realization that many different network conditions and data processing configurations can cause, in different degrees for different data streams, degradation of the quality of the communications services. In order to manage the quality of service associated with a media stream, for example, various network metrics indicative of quality of service, such as latency, jitter, packet loss rate, video quality, frame rate, etc., can be determined by intercepting and analyzing data packets being transmitted over a network. However, due to the volume of data packets, it is virtually impossible to intercept and analyze all of the data packets being transmitted over the network. On the other hand, while legacy systems allow participants to a communications session (e.g., a media-over-IP session) to record media data (e.g., voice data) of the session, the media data typically does not contain sufficient information for determining the aforementioned network metrics indicative of quality of service.

With the embodiments of the present disclosure, a first server (e.g., an application server) can determine that at least one media quality metric associated with a media session is below one or more pre-determined thresholds, or receive an indication from a participant of the media session that the media quality of the session falls below one or more pre-determined thresholds. The application server can then obtain identification information associated with the media session. The application server can provide the identification information to a second server (e.g., a media server), and receive from the media server data related to a transmission of data packets after the identification information is provided. The application server can determine configurations for both the application server and the media server based on the received data related to a transmission of data packets, the configurations being related to transmission of data packets by the application server and the media server. At least one of the application server and the media server can then, based on the determined configurations, provide a pre-determined media quality.

With embodiments of the present disclosure, data packets for a particular media session of which one or more media quality metrics falls below a threshold, which may be predetermined or set dynamically, can be identified and analyzed. Based on the data packets, various network metrics associated with that media session can be determined. Accordingly, remedial actions (e.g., configurations for at least one of the application server and media server) specific for improving or maintaining a media quality of the media session can be determined, which can enable more effective and efficient management of data transmission over a network.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings:

FIGS. 3A and 3B are diagrams of exemplary data structures for storing a set of metrics related to triggering of media data packet capture, consistent with the present disclosure.

FIG. 4 is a diagram of an example of a system for implementing embodiments consistent with the present disclosure.

DETAILED DESCRIPTION

Figure 1:
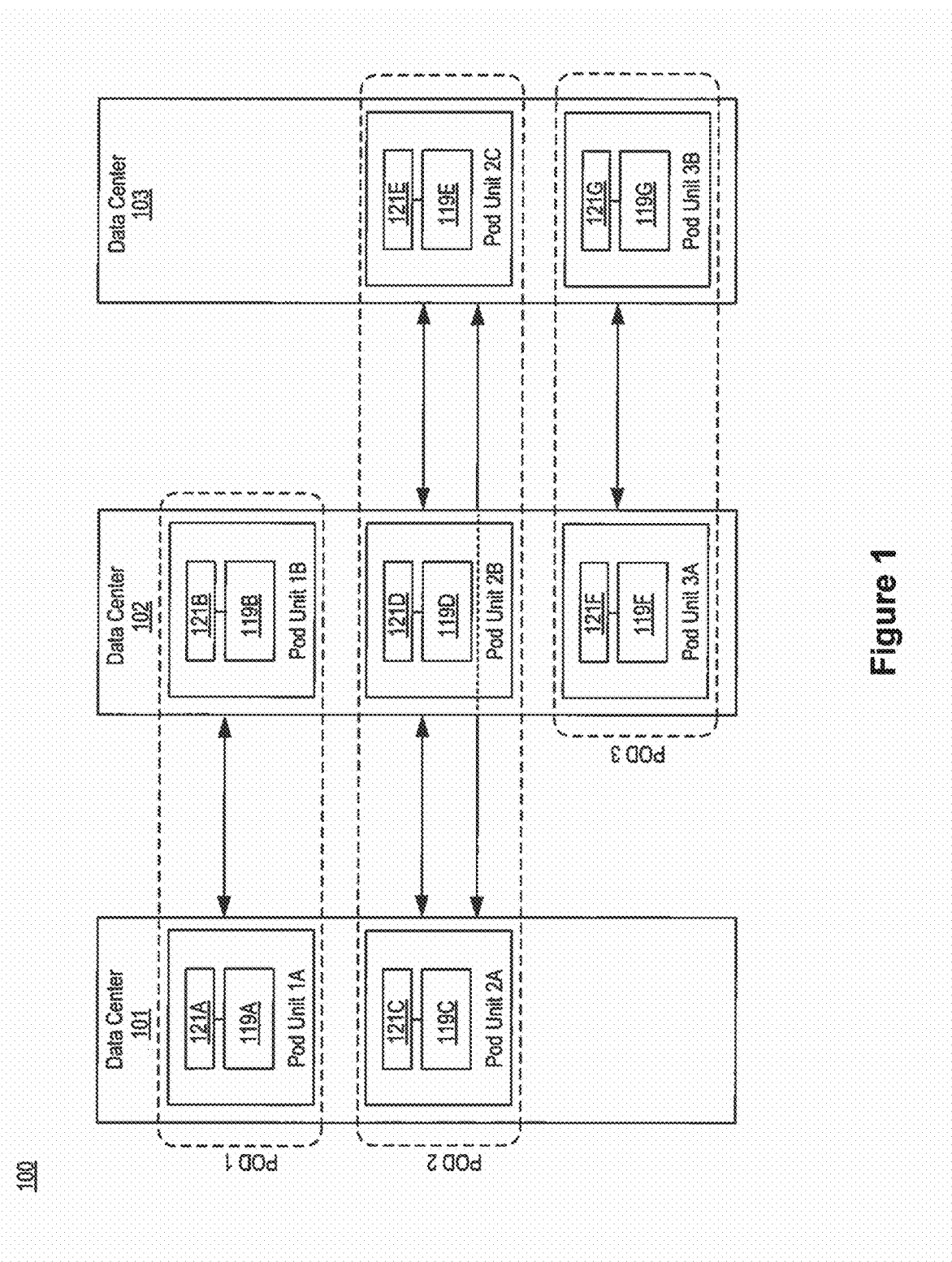
FIGS. 1 and 2 are diagrams of example communications systems n which various implementations described herein may be practiced.

The embodiments disclosed herein concern improving media data communications over a network. In some embodiments, a first server (e.g., an application server) having one or more processors can determine that at least one media quality metric of a media session over the network is below one or more thresholds. The at least media quality metric is indicative of a media quality, and the one or more thresholds can be pre-determined or set dynamically. The first server, after the determination that at least one metric is below the one or more thresholds, can obtain identification information associated with the media session, and provide control data including the identification information to a second server (e.g., a media server) to receive data related to a transmission of data packets based on the identification information. The first server can then determine configurations for at least one of the first and second servers based on the received data, and configure at least one of the first and second servers based on the determined configurations, to provide a pre-determined media quality, and an improved user experience.

In some embodiments, the at least one media quality metric can include at least one of: mean opinion score (MOS), jitter, packet loss, and latency. In some embodiments, the at least one metric can also be associated with a codec, and the identification information can include information related to the codec.

In some embodiments, based on the received data from the first network element, the first server can determine configurations for at least one of the first server and second server including, for example, selection of a second codec and a second bit rate for transcoding the data packets, data packet queuing policy, etc.

With embodiments of the present disclosure, data packets for a particular media session of which one or more media quality metrics falls below the one or more thresholds can be identified and analyzed. Based on the data packets, various network metrics associated with that media session can be determined. Accordingly, remedial actions (e.g., configurations for network elements that transmit the data packets) specific for improving or maintaining a media quality of the media session can be determined, which can enable more effective and efficient management of data communications over a network.

Reference will now be made in detail to methods and specific implementations that seek to overcome the previously mentioned shortcomings of current systems for processing network requests. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as provided by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The example embodiments herein include computer-implemented methods, non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium. As used herein, a non-transitory computer-readable storage medium can include, for example, a memory stick or card, a flexible disk, hard disk, solid state drive, optical data storage medium such as a CD-ROM or DVD-ROM, or any other data storage medium a RAM, a PROM, and EPROM, a FLASH-EPROM or any other flash memory, NVRAM, a cache, a register, any other memory chip or cartridge, and networked versions of the same. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified.

A computer-readable storage medium can store instructions for execution by at least one processor, including instructions for causing the processor to perform steps or stages consistent with the embodiments described herein. Additionally, one or more computer-readable storage mediums can be utilized in implementing a computer-implemented method. The term "computer-readable storage medium" should be understood to include tangible items and exclude carrier waves and transient signals.

FIG. 1 depicts an example of a communications system 100 in which the management of network resources for multimedia communication as described herein may be implemented. System 100 can be, for example, a telephony system such as a hosted Private Branch Exchange (PBX) platform that provides voice and video over IP, fax services, etc. In some examples, one or more components of communication system 100, such as data centers 101, 102, and 103, can be used to implement computer programs, applications, methods, processes, or other software to perform the described techniques and to realize the structures described herein. Communications system 100 includes data centers 101, 102, and 103. Each data center is a point of presence (POP) that includes the network computing resources (e.g., servers, routers, switches, network connections, storage devices, etc.) for supporting the services provided by communication system 100. Each data center is typically located in a different geographical region.

In the example embodiment depicted in FIG. 1, communication system 100 includes three user points of data (pods), i.e., pods 1, 2 and 3, each of which is a logical grouping of two or more pod units situated in different data centers. Of course the number of pods may be greater or fewer in different configurations. Each pod serves a different subset of users. In this example, each pod unit (e.g., unit 2A) can serve the same subset of users as the other pod units within the same pod (e.g., pod units 2B and 2C). Each pod unit includes servers 119A-119D configured to provide communication services for the subset of users. Each pod unit 1A-3B can also include an account database 121A-G configured to support the respective servers for a corresponding subset of users.

It should be noted that the term "user" is being employed in the interest of brevity and may refer to any of a variety of entities that may be associated with a subscriber account such as, for example, a person, an organization, an organizational role within an organization, a group within an organization, etc. As to be described later, servers 119A-119D can be configured to implement techniques described herein for managing media data transmission over a network.

Figure 2:
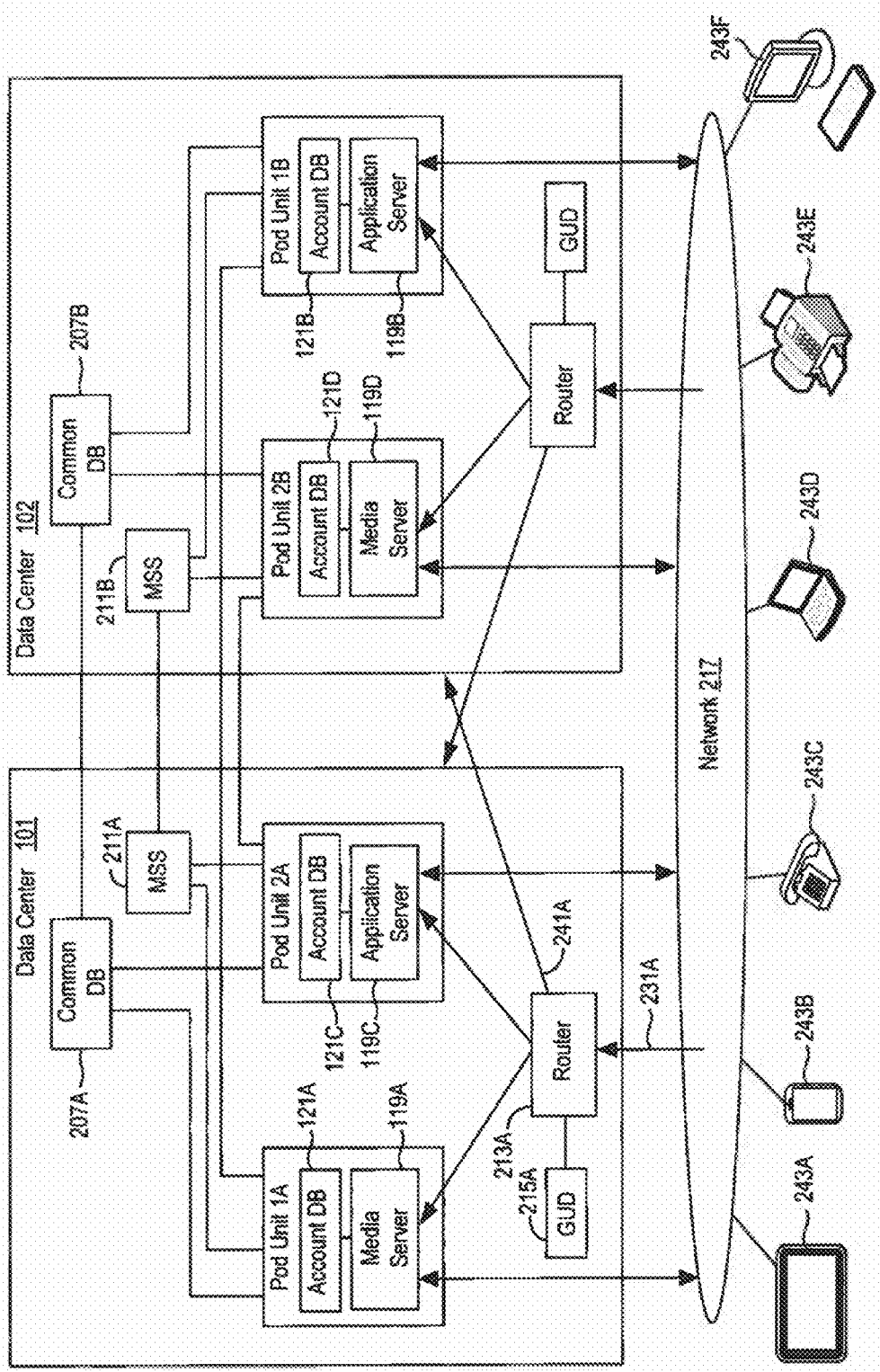

FIG. 2 shows various components of communication system 100 of FIG. 1. In some examples, one or more components of communication system 100, such as data centers 101 and 102, and/or communication endpoints 243A-243F can be used to implement computer programs, applications, methods, processes, or other software to perform the described techniques and to realize the structures described herein. Specifically, FIG. 2 shows the various interconnections within and between data centers 101 and 102. Both data centers 101 and 102 are in communication with example network 217. Although FIG. 2 shows that network 217 as a single entity, it is understood that network 217 can include multiple sub-networks of different types, such as packet-based IP networks and public switched telephone network (PSTN). Service requests from various communication endpoints 243A-243F are routed through network 217 to either or both of the data centers. Communication endpoints 243A-243F represent a diversity of client devices that connect with a services system designed in accordance with one or more implementations as described herein. Such client devices include electronic devices, such as, cell phones, smart phones, tablets, laptop and desktop computers, conventional telephones, phones that support media-over-IP (e.g., voice-over-IP), teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure, Servers 119A-119D may provide multimedia services to subsets of users. In a case where packet-based communications service (e.g., media-over-IP service) is provided, servers 119A-119D can be configured to process and transmit data packets associated with a media session (e.g., an RTP session). For example, some of the servers 119A-119D (e.g., servers 119B and 119C) can be configured as an application server for transmitting and processing signaling data packets for the media session, and some of the servers (e.g., servers 119A and 119D) can also be configured as a media server transmitting and processing media data packets for the media session.

In some embodiments, application server 119B (and/or application server 119C) may receive a service request 231A (e.g., a HTTP request, a SIP request, a RTP request, etc.) routed from router 213A, and in response, transmit and process signaling data packets to establish a connection for the service request. The signaling data can include data used to set up a connection in a telephone network, which can include routing information (e.g., the IP address and port number for transmission of media-over-IP data). Application server 119B may also determine a mapping between the routing information and a specific media session. As to be discussed below, in a preferred embodiment, application server 119B can obtain a media session identifier associated with a media session, and provide the media session identifier to a media server (e.g., media servers 119A and 119D) configured to process the media data of the media session. The media server can, based on the media session identifier, extract routing information associated with the media session (e.g., IP address, port number, etc.), and perform capture of media data associated with that media session based on the routing information. The application server may analyze the media data to determine a source of degradation of media quality, and to provide remedial actions to improve or maintain a media quality for the media session.

Application server 119B may receive a trigger for capture of media data. As to be discussed below, such a trigger can be generated automatically based on certain network metrics that reflect a media quality associated with a media session. Such a trigger can also be generated based on a users input. For example, a user may file a ticket reporting media quality problem with a media session. After receiving the trigger (either generated automatically or from a user), application server 119B may transmit a command to the media server to perform the media capture, In some embodiments, as discussed before, media servers 119A and 119D can be configured for transmitting and processing media data packets for the media session. The media data packets may include audio and video data contents being transmitted as part of the media session. Media servers 119A and 119D may perform processing of the media data packets, such as buffering incoming data packets in a queue before processing the packets, transcoding audio packets using different codecs to reduce size of audio packets in light of network conditions, adding application-specific effects to the audio data (e.g., by adding a dial-tone to mimic a telephone call), encrypting the data, and transmitting the media data packets according to the routing information associated with a media session.

In a preferred embodiment, media server 119A (and media server 119D) may also capture media data packets based on a command from an application server (e.g., application server 119C). For example, based on the IP address and port number information provided by application server 119C, media server 119A can capture media data packets associated with the IP address and the port number. The capturing may include, for example, duplicating the data contents of the media data packets, and performing various measurements on the data packets (e.g., arrival time and transmission time of each packets, inter-packet delay, percentage of packets dropped, etc.). Media server 119A may then provide the captured data back to the application server 119C for analysis.

In some cases, the application server, and the media server that receives the command from the application server for media data capture, can be of the same data center (e.g., media server 119A and application server 119C of data center 101). In some cases, an application server may transmit a command to a media server of a different data center for media data capture (e.g., application server 119C of data center 101 transmits the command to media server 119D of data center 102). For example, the media server may be located in a data center that is at vicinity of network 217 to reduce transmission distance for the media data packets. While the present disclosure describes an application server and a media server as examples, other components could be used to provide similar functionality as described herein.

Each pod unit also includes an account database (e.g., any one of account databases 121A-121G) to support the server(s) for that particular pod unit, storing configuration details and other information regarding each user's account. For example, the account databases 121A-121G can store a mapping between users to a communications session and information that identify a media session which, as to be discussed later, can be used by an application server to identify data packets associated with the media session for a determination of network metrics for that media session. The network metrics information can then be used to determine a set of configurations to improve or maintain a media quality for the media session.

Pod units 1A and 1B are in communication with one another so that the data on their respective account databases are synchronized across data centers, Data center 101 includes router 213A to receive incoming service request 231A from network 217. Router 213A parses the incoming service request to identify or extract a user key which can be used to identify a user. The incoming service can also include other information. For example, in a case where the incoming service request 231A includes a SIP request, the SIP request can include a telephone number of the called party, and router 213A can parse the service request to extract the telephone number. From the telephone number, router 213A can determine, for example, a geographical location associated with the requested service.

Using the extracted information, router 213A can query GUD 215A to determine which pod is associated with the user key and/or with the geographical location. Depending on the querying result, router 213A may route the service request to data center 101, or another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

In some embodiments, data centers 101 and 102 are configured to provide a predetermined quality of service for a media session. As an example, in a case where a media-over-IP service is provided, data centers 101 and 102 can provide a predetermined quality of the media-over-IP service between at least two of communication endpoints 243A-243F. The quality of the media-over-IP service can be defined as, for example, a measurable level of telephony service delivered to the communication endpoints, depending on system and/or network configuration. In some examples, the quality can be affected by various metrics, such as digital signal processing capability of media servers 119A and 119D. Moreover, network 217 can contribute to certain probability of packet loss, latency (or latency variation), jitter, burstiness of loss, or the like, which can be determined by the standards (e.g., LTE, 3G, etc.) and protocols (e.g., TCP/IP, ATM, etc.) associated with network 217. Moreover, the physical distances from data centers 101 and 102 to the communication endpoints 243A-243F can further exacerbate packet loss and latency, when the data packets are routed through a relatively long distance and through a large number of network elements. Furthermore, the processing capacity of media servers 119A and 119D, as well as communication endpoints 243A-243F, also affect the speed of processing of the data packets transmitted through network 217. All of the aforementioned properties can influence the loss rate of data packets and perceived latency in transmission of audio/video data, which in turn affect the perceived quality of the media-over-IP service.

Moreover, typically audio and video information are digitized and compressed with a particular coder into data packets for transmission over the network 217. As described above, media servers 119A and 119D can transcode audio data using different coders. The choice of coder can be driven by a tradeoff between quality and bandwidth requirement. As illustrative examples, G.729 coder operates at a lower bit rate and has low network bandwidth requirement, but offer inferior audio quality than, for example, 0.711 and 0.722 coders, which operate at higher bit rates and offer better audio quality (e.g., higher sampling rate, higher frame rate, etc.), but have higher network bandwidth requirements. Also, the 0.729 coder typically is more computation intensive than G.711 and G.722 codecs, and can introduce additional latency in processing and transmission of data packets at the servers. Based on network metrics (e.g., packet loss, latency, etc.) that indicate a certain availability of network resources, media servers 119A and 119D can be configured to use a coder associated with a bit rate that can be supported by the available network resources indicated by the network metrics, while the media quality provided by that coder can still satisfy a certain threshold.

Further, data centers 101 and 102 can be configured to provide a pre-determined quality of media-over-IP service for a particular user. For example, a user who operates one of communication endpoints 243A-243F can subscribe to a specific calling plan under which the user is to be provided with a pre-determined quality of media-over-IP service. Different users may subscribe to different calling plans. As a result, media sessions associated with different users can also be associated with different media quality thresholds. The calling plan and associated media quality information can be part of user account information stored in account databases 121A-121D.

As discussed above, there are multiple network elements (e.g., network 217, data centers 101 and 102 etc.) that can affect the quality of the provided service, and that different media sessions can be associated with different media quality thresholds. Therefore, to improve the quality of a particular media session, an application server and a media server of data centers 101 and 102 (e.g., application servers 119B and 119C, media servers 119A and 119D) can identify media data packets associated with that media session as these packets are transmitted along a network path comprising the media server. The application server can then transmit a command to a media server to cause the media server to capture information associated with the identified media data packets (e.g., arrival time and transmission time of each packets, inter-packet delay, percentage of packets dropped, the data content, etc.). The application server can perform analysis on the media data packets to determine metrics that reflect a media quality, such as latency, jitter, packet loss rate, etc., and determine configurations for these network elements to provide a pre-determined quality for that media session. The configurations can include, for example, selecting a certain coder for transcoding media data for that media session at the media server to achieve a certain bit rate, implementing a certain queue policy to prioritize transmission and processing of data packets associated with that media session at the media server, etc.

However, given that there can be a large number of media sessions underway over the network 217 at the same time, and that a huge volume of data traffic can be involved, the applications server can identify the media session to be captured based on, for example, certain network metrics that reflect a media quality associated with a media session falling below a predetermine threshold, and/or based on a user's input.

Figure 3A:
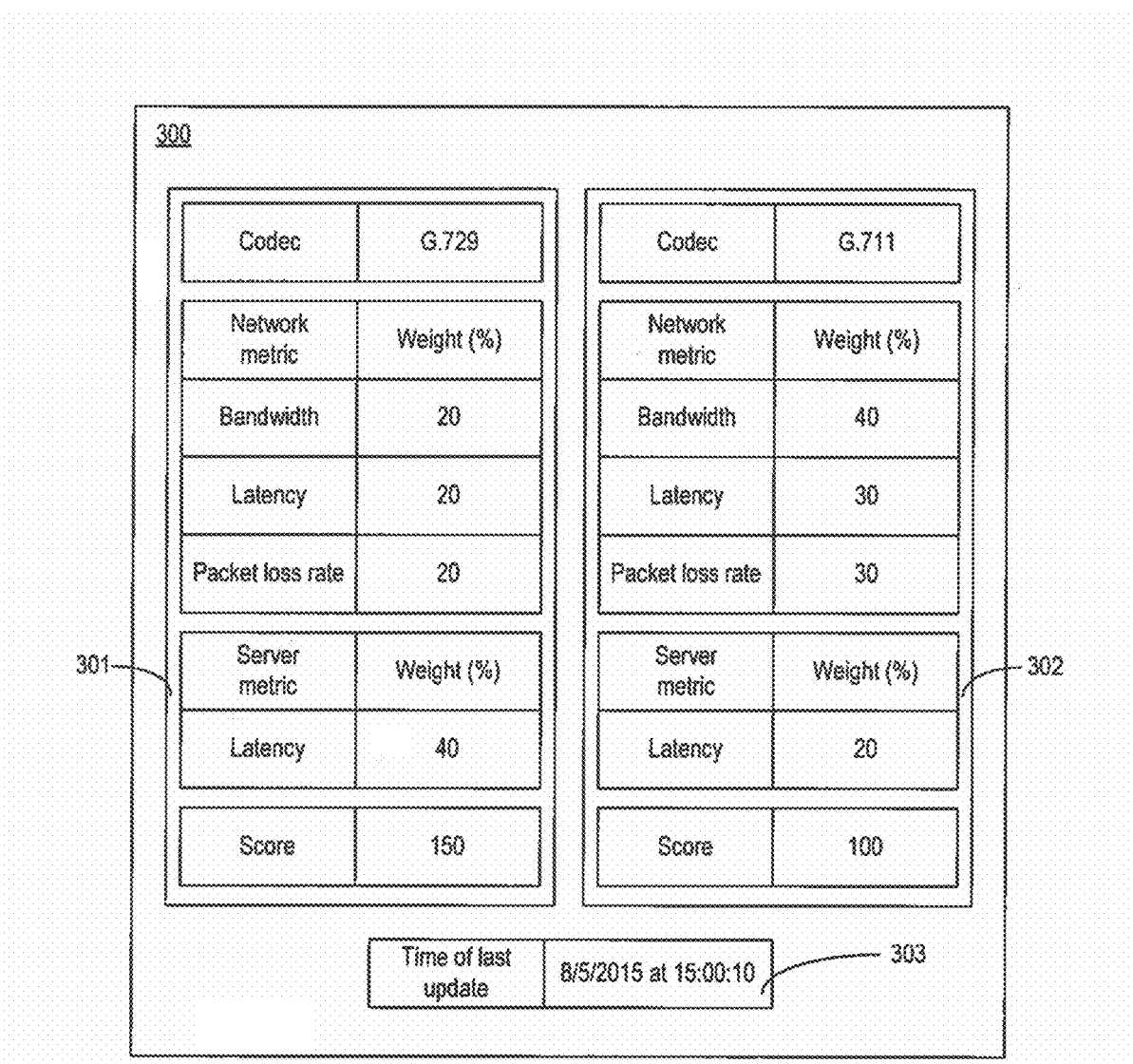

In some embodiments, the identification of a media session of which the media quality falls below a predetermined threshold can be based on a weighted average of metrics associated with a particular coder. Reference is now made to FIG. 3A, which depicts a data structure 300 for storing a set of metrics related to the network and the servers, consistent with disclosed embodiments. As shown in FIG. 3A, data structure 300 includes example tables 301 and 302. Tables 301 and 302 associate a set of network and server metrics with a set of weights. Based on the weights, one or more scores representing expected media quality can be determined after the metrics data are collected. Each weight can reflect a degree of influence of that particular metric on the media quality. Each table can also be associated with a particular coder (e.g., table 301 is associated with G.729 coder, while table 302 is associated with G.711 coder), and the weight distributions for the metrics can be different for different coders. For example, as discussed before, G.729 codec operates at a lower bit rate and has low network bandwidth requirement, but offer inferior audio quality than, for example, G.711 and G.722 coders, but typically is more computation intensive than G.711 and G.722 coders. As a result, as shown in FIG. 3A, the weight associated with a latency at server for coder G.729 can be larger than that for coder G.711, due to the larger requirement of computation power for G.729. Moreover, the weights associated with the network metrics (e.g., network bandwidth, network latency, packet loss rate, etc.) for coder G.711 can also be larger than those for coder G.729, due to the higher bit rate requirement of G.711.

Further, the set of network and server metrics data can be collected at the media server (e.g., media servers 119A and 119D) configured to transmit and process data packets. In some embodiments, the media server can determine a coder associated with a stream of data packets by, for example, identifying certain payload content (e.g., meta data) in those data packets.

Media server 119A (and 119D) can also determine, based on the timestamps associated with the processing of the data packets, metrics that reflect latency and jitter (e.g., variation of inter-packet latency). The timestamp information can be derived locally by media server 119A (e.g., by keeping track of the time at which the media server receives a data packet and the time at which the media server transmits the data packet). In additional, Real-time Control Protocol (RTCP), an IETF (Internet Engineering Task Force) defined protocol for providing out-of-band statistics and control information for an RTP session, provides periodic transmission to participants of an RTP session various packets, such as sender report, receiver report, etc. The receiver report can include information such as transmitted RTP packet counts, lost packet counts, jitter, round-trip delay time, etc.

Media server 119A can also generate the metrics data based on the information included in the receiver report, or forward the receiver report to the data center. The metrics data collection can be performed over a certain sample size of data packets associated with a particular codec, and can be performed periodically (e.g., once every 10 seconds, based on the period of transmission of RTCP report, etc.).

Based on the weights and the metrics data, one or more scores representing expected media quality can be determined. For example, the scores can represent an MOS (mean opinion score) and can be determined according to the E-model specified by International Telecommunication Union (ITU) in ITU-T Recommendation G.107. Both the scores and the weights can also be updated at the same rate at which the metrics data are sampled. For example, as shown in FIG. 3A, table 303 records the time of last update of the scores and the weights on Aug. 5, 2015 at 15:00:10, at the end of a 10-second interval In some embodiments, the metrics and score information can also be determined by an application server (e.g., application servers 119B and 119C) after receiving samples of timestamp and sequence number information from the network elements. Application server 119B (and 119C) can then determine whether the score associated with a codec is below one or more thresholds. The thresholds can be predetermined or set dynamically, and can be configured based on various factors, such as expected media quality for that codec based on, for example, historical measurement of metrics data associated with the codec.

If application server 119B determines that the score is below the one or more thresholds, application server 119B can instruct the media server to collect metrics data for data packets associated with that codec for further analysis, the details of which will be described below. The data packets to be analyzed can be of a larger sample size than the data packets collected for score determination (e.g., being associated with a larger number of media sessions, collected within a longer duration, sampled at a higher rate, etc.). In some embodiments, historical samples of the metrics, and the associated scores, can also be stored at a database. The historical samples and the associated scores can then be used to determine a moving trend of the scores. For example, if application server 119B determines that there is a downward trend of the scores, application server 119B can also instruct the media server (e.g., media server 119D) to collect metrics data for all data packets associated with that codec for further analysis, even if the latest score is not yet below the one or more thresholds. In both cases, application server 119B can transmit identification information that identifies that codec to media server 119D, which can then identify data packets associated with that codec (e.g., by examining the meta data), and collect metrics data for the identified data packets. Data representing data structure 300, and the metrics data, can be stored at a database (e.g., CDB 207A of FIG. 2).

In some embodiments, the identification of a media session of which the media quality falls below a predetermined threshold can also be based on other indications. For example, a participant to a media session can submit a problem ticket to report a drop in media quality for that media session. The problem ticket, which includes the media session information such as, for example, subscriber identifier, can then be transmitted to application server 119B (and 119C). Based on the information included in the ticket, such as the subscriber identifier, application server 119B can determine to collect metrics data for data packets associated with that media session (or a user associated with the media session), and obtain other information which it can provide to a media server (e.g., media server 119D) to start metrics data collection.

Reference is now made to FIG. 3B, which depicts a data structure 320 that stores information for metrics data collection. As shown in FIG. 3B, data structure 320 stores a record that includes a media session identifier 322, tags 324 and 326, source IP address 328, destination IP address 330, and ticket identifier 334. In some embodiments, media session identifier 322 can be an identifier configured to identify a media session underway in a network. Media session identifier 322 can be associated with other identification information which can be specific to the protocol for the media session. For example, tags 324 and 326 can be From Tag and To Tag configured to identify Dialogs under SIP, as defined in Request For Comments (RFC) 3261. Tags 324 and 326 can be used also to identify a call leg of, for example, a media-over-IP session initiated using the SIP protocol. Media session identifier 322 can also be associated with source IP address 328 and destination IP address 330, which can be the IP addresses associated with data packets for that media session. Data structure 320 also include port numbers associated with these addresses (not shown in FIG. 3B). Further, media session identifier 322 can also be associated with ticket identifier 334, which can be used to identify a ticket received by the data center concerning this particular media session. Portions of data structure 320 can be stored at different databases. For example, an account database (e.g., account DB 121A) can store an association among session identifiers 322, tags 324 and 326, and ticket identifier 334, while another database (e.g., CDB 207A) can store an association among tags 324 and 326, source IP address 328, and destination IP address 330.

Based on the data stored in data structure 320, application server 119B (and 119C) can provide information for metrics data collection to a media server (e.g., media server 119D). For example, after receiving a ticket from a participant to a media session, application server 119B can determine the session identifier associated with the media session based on the ticket identifier associated with the ticket. Application server 119B can then provide the session identifier to a media server (e.g., media server 119D), which can then determine tags 324 and 326 based on the session identifier by querying, for example, account DB 121A. Media server 119D can then determine, based on the tags, the source and destination IP addresses (and the port numbers) of the data packets associated with the media session by querying, for example, CDB 207A Based on the source and destination IP addresses and the port numbers information, media server 119A can then collect metrics data only for data packets associated with the source and destination IP addresses and port numbers provided by the data center. In some embodiments, application server 119B can also obtain the source and destination IP addresses (and the port numbers) of the data packets associated with the media session by querying CDB 207A, and provide the source and destination IP addresses and the port numbers information to media server 119A, which can then collect metrics data based on the information.

In some embodiments, application server 119B (and 119C) can also transmit a request to a media server (e.g., media server 119A) to cause the media server to create a duplicate of the identified data packets, and to provide the duplicates to the application server, which can then derive metrics data from the duplicated data packets.

After instructing the media server to collect metrics data for a certain set of data packets (e.g., associated with a particular codec, or associated with a particular media session), or to duplicate the set of data packets, application server 119B (and 119C) can perform further analysis. The analysis can include, for example, analyzing inter packet delay, packet loss, or bit rate associated with a codec (e.g., if the codec is rate-adaptive, such as OPUS), for the set of data packets at each of the network elements involved in the transmission and processing of the data packets.

Based on a result of the analysis, application server 119B (and 119C) can then determine one or more configurations to manage the media quality associated with the set of data packets. For example, in a case where media server 119D is determined to be a bottleneck (e.g., as reflected by huge latency introduced by the server), application server 119B can determine to cause media server 119D to update its data packet queuing policy to, for example, give higher priority to the set of data packets. The application server can also determine to reroute the data packets (e.g., by updating a configuration at routers 213A) to a different server. For example, instead of routing the media data packets to media server 119D, application server 119B may determine to route the media data packets to media server 119A for processing.

Moreover, based on a determination that the codec is associated with a low media quality, application server 119B (and 119C) can also determine to select a different codec and bit rate for transcoding the media data, to either alleviate the computation requirement at the server or the network bandwidth requirement for processing of the media data. The application server can also perform other actions, such as transmitting messages to inform participants to the media session about the change in network capacity and media quality, etc.

As to be described below, data structures 300 and 320 can be part of a media quality management system, which can control each of the network elements involved in the transmission of data packets to provide metrics data (and/or duplicate data packets) for detection of changes in media quality, and for further analysis to determine remedial actions to address the changes. Further, the example contents of data structures 300 and 320 are provided only for illustration purposes only, and do not limit the scope of the present disclosure.

FIG. 4 is a block diagram of an example system 400, consistent with disclosed embodiments. System 400 can be part of a communication device that is used in a communication system and that can function as any of the communication devices depicted in FIG. 2 (e.g., communication endpoints 243A-243F, servers 119A-119D, router 213A, etc.), as well as the aforementioned servers 119A-119D, with techniques consistent with embodiments of the present disclosure.

System 400 includes a bus 402 or other communication mechanism for communicating information. Bus 402 interconnects subsystems and devices, such as one or more processors 404, system memory ("memory") 406, storage device 408 (e.g., ROM), disk drive 410 (e.g., magnetic or optical), communication interface 412 (e.g., a modem, Ethernet card, or any other interface configured to exchange data with a communications network), display 414 (e.g., CRT or LCD), input device 416 (e.g., keyboard), and pointer or cursor control 418 (e.g., mouse or trackball).

According to some examples, computer system 400 performs specific operations in which processor 404 executes one or more sequences of one or more instructions stored in system memory 406. Such instructions can be read into system memory 406 from another computer readable medium, such as static storage device 408 or disk drive 410. In some examples, hard-wired circuitry can be used in place of or in combination with software instructions for implementation. In the example shown, system memory 406 includes modules of executable instructions for implementing an operation system ("O/S") 432, an application 436, and a communication manager module 438, which can provide the functionalities disclosed herein.

In some examples, execution of the sequences of instructions can be performed by a single computer system 400. According to some examples, two or more computer systems 400 coupled by communication link 420 (e.g., links to LAN, PSTN, or wireless network) can perform the sequence of instructions in coordination with one another. Computer system 400 can transmit and receive messages, data, and instructions, including program code (i.e., application code) through communication link 420 and communication interface 412. Received program code can be executed by processor 304 as it is received, and stored in disk drive 410, or other non-volatile storage for later execution.

In some examples, where system 400 is part of a media quality management system, storage device 408 can store data structures 300 and 320 of FIGS. 3A-B, and the associated network element configuration settings. Application 436 can receive a request for network resources for communication session (e.g., an RTP session) via bus 402 and communication interface 412. If a participant to the session has subscribed to a certain quality of service for the session, application 436 can then determine whether the quality of service for that session is below one or more thresholds, which can be pre-determined or set dynamically, based on the metrics stored in data structure 300 or based on information received from participants of the media session (e.g., ticket information as stored in data structure 320). Application 436 can also transmit instructions, via communication interface 312, to other network elements involved in the transmission of data packets for that media session (e.g., media server 119A), to collect data related to a transmission of the data packets (e.g., metrics data, duplicates of the data packets, etc.), and to provide the collected data back to system 400 for further analysis. Application 436 can then perform further analysis on the information provided by the network elements, and determine remedial actions (e.g., configurations for the media server) to manage the media quality for that media session.

Figure 5:
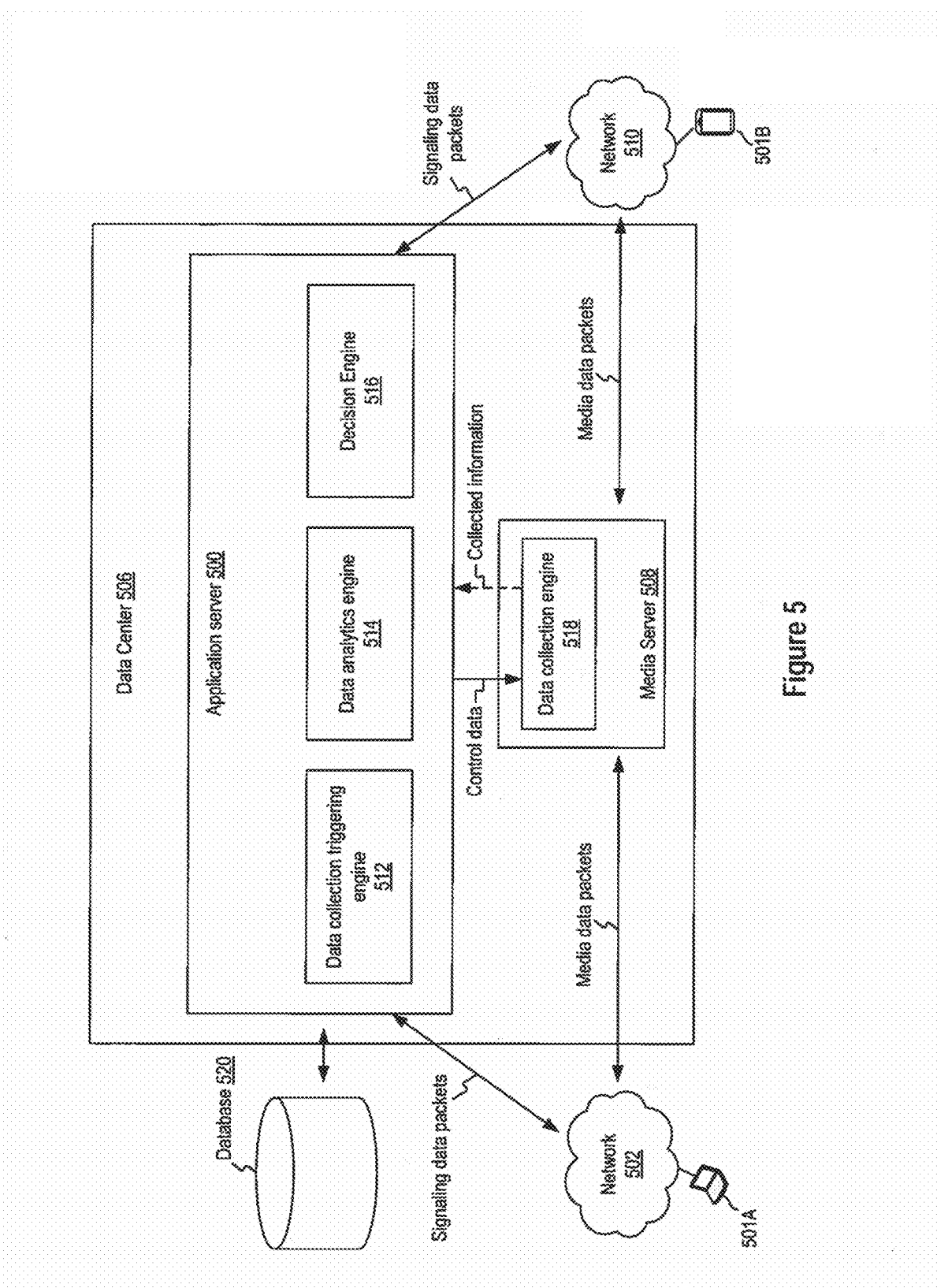
FIG. 5 is a diagram of an example system architecture for managing media data transmission over a network, consistent with the present disclosure.

FIG. 5 is a simplified block diagram of an example application server 500 for managing media data transmission over a network, consistent with disclosed embodiments. As shown in FIG. 5, in a preferred embodiment, application server 500 can be part of data center 506, which further includes media server 508. Both application server 500 and media server 508 are communicatively connected with communication endpoints 501A and 501B via, respectively, network 502 and network 510. Endpoints 501A and 501B can be any of the endpoints of FIG. 2.

As shown in FIG. 5, application server 500 can transmit control data to media server 508. The control data can include information that enables media server 508 to collect data related to a transmission of data packets, such as metrics that reflect a media quality, and duplicates of the data packets. The control data can define the scope of metrics data to be collected, such as source and destination IP addresses and port numbers for the data packets of which duplicates or metric data are to be generated, codec information of the data packets, the type of metrics data to be collected (e.g., timestamp, latency, etc.), the sampling time period and duration for the data collection, etc. The control data can also include configuration information for media server 508, such as codec selection, routing direction, or the like, determined by application server 500 based on the data collected by media server 508. In some embodiments, application server 500 can perform similar functionalities as application servers 119B and 119C of FIG. 2, while media server 508 can perform similar functionalities as media servers 119A and 119D of FIG. 2. The example application server 500 shown in FIG. 5 can include a data collection triggering engine 512, a data analytics engine 514, and a decision engine 516. The example media server 508 shown in FIG. 6 can also include a data collection engine 518. Each engine 512, 514, 516, and 518 can either be a software program that performs a particular function of related functions, or a packaged functional hardware unit designed for use with other components. Application server 500 can also interface with database 520, which can store the data received by application server 500, as well as a result of analysis on those data by the system.

In some embodiments, data collection triggering engine 512 can determine whether to collect data related to the transmission of data packets between endpoints 501A and 501B. As discussed before, the collection of data can be triggered based on a determination that one or more scores representing expected media quality associated with a particular codec fall below the one or more thresholds. The scores can be determined based on a weighted average of various metrics (e.g., latency, packet loss rate, etc.) as defined according to data structure 300 of FIG. 3A, with the metrics collected periodically (e.g., once every 10 seconds) by media center 508. The collection of data can also be triggered based on a determination that those scores, associated with a particular codec, exhibit a certain downward trend. Upon determining that the data packets being transmitted between endpoints 501A and 501B are associated with that particular codec, data collection triggering engine 512 can determine to collect data related to the transmission of those data packets. In some embodiments, the collection of data can also be triggered based on control data (e.g., a ticket reporting drop in media quality) received from at least one of endpoints 501A and 501B. Based on the control data from endpoints 501A and 501B, data collection triggering engine 512 can determine identification information (e.g., source and destination IP address, port number, etc.) of data packets of which metrics data are to be collected, according to data structure 320 of FIG. 3B. The metrics data, as well as data organized in the form of data structures 300 and 320, can be stored in database 520, which can then be retrieved by data collection triggering engine 512 to determine whether data collection is to be triggered.

After determining that data collection is to be triggered, data collection triggering engine 512 can then transmit control data that define the scope of metrics data to be collected, such as source and destination IP addresses and port numbers for the data packets of which duplicates or metric data are to be generated, coder information of the data packets, the type of metrics data to be collected (e.g., timestamp, latency, etc.), the sampling time period and duration for the data collection, etc., to media server 508. Data collection engine 518 of media server 508 can then perform the data collection based on the control data.

Data collection engine 518 of media server 508 can interface with various components within media server 508 to perform the data collection. For example, to measure latency, data collection engine 518 may monitor media data packets that are stored in a queue for transmission. For the queued media data packets that are associated with the destination IP addresses and port numbers listed in the control data, data collection engine 518 may determine the time these packets spent in the queue before being transmitted, for the latency determination. Data collection engine 518 may also intercept the data packets at the queue may also determine a percentage of packets dropped from the queues at media server 508. Data collection engine 518 may also monitor missing RTP sequence numbers to determine packet loss at, for example, network 510.

In some embodiments, data analytics engine 514 can perform analysis on the data collected by media server 508. The analysis can include, for example, analyzing inter packet delay, packet loss, or bit rate associated with a codec (e.g., if the codec is rate-adaptive, such as OPUS), for the set of data packets at media server 508. Data analytics engine 514 can then provide a result of the analysis to decision engine 516.

In some embodiments, decision engine 516 can, based on a result of the analysis from data analytics engine 514, determine one or more configurations to manage the media quality associated with the set of data packets. For example, if decision engine 516 determines that media server 508 is a bottleneck, it can determine to route the data packets to some other media servers of other data centers (not shown in FIG. 5), cause media server 508 to update its queuing policy, to use different codecs to reduce bit rate and bandwidth requirement, etc. Decision engine 516 can also perform other actions, such as transmitting a message to endpoints 501A and 501B indicating about the change in network capacity, transmitting a message to other devices to collect data related to the transmission of the set of data packets, etc. While the remedial actions are being performed, application server 500 may continue to instruct media server 508 to perform the data collection until, for example, when the media session terminates.

Figure 6:
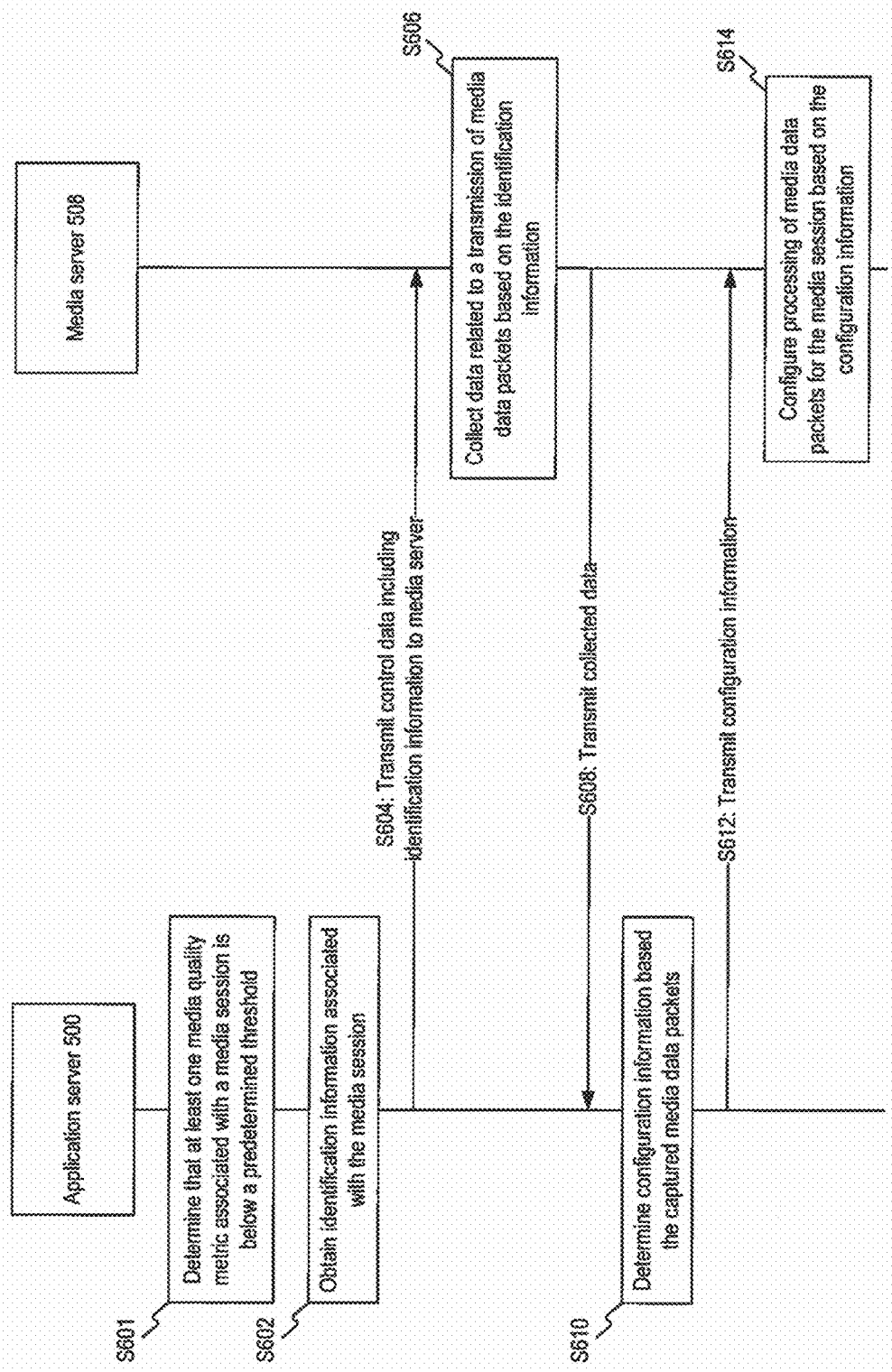
FIG. 6 illustrates n example method for managing media data transmission over a network, consistent with disclosed embodiments.

FIG. 6 is a chart illustrating an example method 600 for managing media data transmission over a network, consistent with disclosed embodiments, with reference to FIG. 5. In this example, an electronic device (e.g., application server 500 of FIG. 5) executes a method 600 to interact with one or more other devices (e.g., data center 506 of FIG. 5) for managing media data transmission over a network that comprises these devices. While the chart discloses the following steps in a particular order, it will be appreciated that at least some of the steps can be moved, modified, or deleted where appropriate, consistent with the teachings of the present disclosure. While the following steps are indicated as being performed by an electronic device, it is appreciated that the steps can be performed by more than one electronic device.

Method 600 begins with step S601 in which data collection triggering engine 512 of FIG. 5 can determine that at least one media quality metric associated with a media session is below a predetermined threshold. As discussed before, the determination can be based on, for example, that one or more scores representing expected media quality associated with a particular codec falls below one or more thresholds which may be pre-determined or set dynamically, and/or that the scores exhibit a certain downward trend. The scores can be determined based on a weighted average of various metrics (e.g., latency, packet loss rate, etc.) as defined according to data structure 300 of FIG. 3A, with the metrics collected periodically (e.g., once every 10 seconds) by, for example, data center 506. Further, the determination can also be based on control data from endpoints 501A and 501B, such as tickets reporting an issue with media quality received from participants to the media session.

In step S602, data collection triggering engine 512 of FIG. 5 can obtain identification information associated with the media session. In some cases, the identification information can include, for example, codec information, if data collection triggering engine 512 determines to further analyze data packets associated with a particular codec, based on information stored in data structure 300 of FIG. 3A In some cases, the identification information can include, for example, source and destination IP addresses and port numbers, based on information stored in data structure 320 of FIG. 3B.

In step S604, data collection triggering engine 512 can transmit control data including identification information to media server 508. The control data can also include information that define the scope of metrics data to be collected, such as type of metrics data to be collected (e.g., timestamp, latency, etc.), the sampling time period and duration for the data collection, etc.

In step S606, data collection engine 518 of media server 508 can collect data related to a transmission of data packets based on the identification information. The collected data can include, for example, metrics that reflect a media quality, duplicates of the data packets, etc. In step S608, data center 506 can then transmit the collected data back to media quality management system 500. Data collection engine 518 may collect the data by monitoring media data packets stored in a queue for transmission, ACK packets, etc.

In step S610, data analytics engine 514 of FIG. 5 can perform analysis on the data collected by data center 606, and determine one or more configurations based on the analysis. The analysis can include, for example, analyzing inter packet delay, packet loss, or bit rate associated with a coder (e.g., if the codec is rate-adaptive, such as OPUS), at data center 506. Based on a result of the analysis by data analytics engine 514, decision engine 516 of FIG. 5 can determine one or more configurations to manage the media quality associated with the set of data packets. For example, if decision engine 516 determines that data center 506 is a bottleneck due to a choice of computation-intensive coder, it can configure data center 606 to use a different rodeo that is less computation-intensive. Decision engine 516 can then transmit the coder configuration information to media server 508, in step S612. Media server 508 can then configure the processing of data packets based on the configuration information, in step S614. For example, if the coder configuration information indicates to use the G.722 coder, data center 506 can then use G.722 coder to transcode certain set of data packets (e.g., data packets associated with another codec, data packets associated with a certain media session, etc.).

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure herein. It is intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method for improving transmission of media data contained in data packets in a media session established over a network, comprising:

determining, by a first server, that at least one media quality metric associated with the media session is below one or more thresholds, the at least one media quality metric being indicative of a media quality;

obtaining, by the first server, identification information associated with the media session, wherein the media session is a media-over-IP session and the identification information includes information that identifies a call leg of the media session;

providing the identification information to a second server;

after providing the identification information to the second server:

receiving, from the second server, data related to a transmission of data packets and, media data contained in the data packets, wherein the receiving of data related to a transmission of data packets and the receiving of media data contained in the data packets continue until the media session terminates;

determining, by the first server, configurations of at least one of the first server and the second server based on the received data related to a transmission of data packets, the configurations being related to transmission of data packets by at least one of the first server and the second server; and configuring at least one of the first server and the second server based on the determined configurations to provide a pre-determined media quality.

2. The method of claim 1, wherein the identification information associated with the media session is obtained in response to determining that at least one media quality metric associated with a media session is below the one or more thresholds.

3. The method of claim 1, wherein the media quality metric includes at least one of: a mean opinion score, video quality, jitter, inter packet delay, frame rate, and packet loss.

4. The method of claim 1, wherein the media quality metric is associated with a codec, and wherein the identification information includes information related to the codec.

5. The method of claim 1, wherein the identification information is obtained from a database that associates the media session and the call leg.

6. The method of claim 1, wherein the identification information includes an IP address and a port number.

7. The method of claim 1, wherein the data related to a transmission of data packets include a measurement of dropped data packets.

8. The method of claim 1, wherein the data related to a transmission of data packets include timing information of the data packets associated with the media session.

9. The method of claim 1, wherein the configurations include at least one of: a codec for transcoding media content associated with the media session, and queue management policy for data packets associated with the media session.

10. A first server for improving transmission of media data contained in data packets in a media session established over a network, wherein the first server comprises at least one processor configured to:
    determine that at least one media quality metric associated with the media session is below one or more thresholds, the at least one media quality metric being indicative of a media quality;
    obtain identification information associated with the media session, wherein the media session is a media-over-IP session and the identification information includes information that identifies a call leg of the media session;
    provide the identification information to a second server;
    after providing the identification information to the second server:
        receive, from the second server, data related to a transmission of data packets, and media data contained in the data packets, wherein the receiving of data related to a transmission of data packets and the receiving of media data contained in the data packets continue until the media session terminates;
    determine configurations of at least one of the first server and the second server based on the received data, the configurations being related to a transmission of data packets by at least one of the first server and the second server; and
    configure at least one of the first server and the second server based on the determined configurations to provide a pre-determined media quality.

11. The first server of claim 10, wherein the identification information associated with the media session is obtained in response to determining that at least one media quality metric associated with a media session is below one or more thresholds.

12. The first server of claim 10, wherein the media quality metric includes at least one of: a mean opinion score, video quality, jitter, inter packet delay, frame rate, and packet loss.

13. The first server of claim 10, wherein the media quality metric is associated with a codec, and wherein the identification information includes information related to the codec.

14. The first server of claim 10, wherein the identification information is obtained from a database that associates the media session and the call leg.

15. The first server of claim 10, wherein the identification information includes an IP address and a port number.

16. The first server of claim 10, wherein the data related to a transmission of data packets include a measurement of dropped data packets.

17. The first server of claim 10, wherein the data related to a transmission of data packets include timing information of the data packets associated with the media session.

18. The first server of claim 10, wherein the configurations include at least one of: a codec for transcoding media content associated with the media session, and queue management policy for data packets associated with the media session.

* * * * *